US007107758B2

(12) United States Patent
Hirooka

(10) Patent No.: US 7,107,758 B2
(45) Date of Patent: Sep. 19, 2006

(54) FAILURE DIAGNOSIS APPARATUS FOR SECONDARY AIR SUPPLIER

(75) Inventor: Shigemasa Hirooka, Susosno (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 246 days.

(21) Appl. No.: 10/814,168

(22) Filed: Apr. 1, 2004

(65) Prior Publication Data
US 2004/0194446 A1    Oct. 7, 2004

(30) Foreign Application Priority Data
Apr. 3, 2003   (JP) .............................. 2003-100662

(51) Int. Cl.
*F01N 3/00* (2006.01)
(52) U.S. Cl. .............................. 60/277; 60/287; 60/289
(58) Field of Classification Search .................. 60/277, 60/289; 123/26, 698, 699
See application file for complete search history.

(56) References Cited

U.S. PATENT DOCUMENTS

| 5,119,631 | A | * | 6/1992 | Kayanuma et al. ........... 60/274 |
| 5,333,446 | A | * | 8/1994 | Itoh ............................. 60/274 |
| 5,832,721 | A | * | 11/1998 | Cullen .......................... 60/274 |
| 5,852,929 | A | * | 12/1998 | Kato et al. .................... 60/274 |
| 6,393,833 | B1 | * | 5/2002 | Mizoguchi .................... 60/289 |
| 2003/0061805 | A1 | * | 4/2003 | Hirooka et al. ............... 60/289 |
| 2003/0101716 | A1 | * | 6/2003 | Hirooka et al. ............... 60/289 |
| 2004/0074453 | A1 | * | 4/2004 | Roelle et al. ................. 123/26 |

FOREIGN PATENT DOCUMENTS

| EP | 1 293 648 A2 |   | 3/2003 |
| EP | 1293648 A2 | * | 3/2003 |
| JP | A 5-256127 |   | 10/1993 |
| JP | A 9-125945 |   | 5/1997 |
| JP | A 9-125946 |   | 5/1997 |
| JP | A 2003-83048 |   | 3/2003 |

\* cited by examiner

Primary Examiner—Thomas Denion
Assistant Examiner—Loren Edwards
(74) Attorney, Agent, or Firm—Oliff & Berridge, PLC

(57) ABSTRACT

A failure diagnosis apparatus for secondary air supplier according to the present invention determines a failure of a secondary air supplier based on pressure and pressure pulsation in a secondary air supply path. A failure diagnosis is made by determining the presence or absence of pressure pulsation in the secondary air supply path based on a determination threshold, and in the present invention the determination threshold is varied according to a pressure value in the secondary air supply path (a smoothed value or an average value of measured pressure). This permits the apparatus to make an accurate failure diagnosis, while eliminating pressure pulsations except for that due to exhaust pulsation (e.g., that due to noise of the pressure sensor and that caused by surging of an air pump).

14 Claims, 8 Drawing Sheets

FAILURE DIAGNOSIS APPARATUS FOR SECONDARY AIR SUPPLIER

BACKGROUND OF THE INVENTION

1. Field of the Invention

The present invention relates to secondary air suppliers for supplying secondary air to upstream of an emission purifying device of an internal combustion engine and, more particularly, to a failure diagnosis apparatus of the secondary air supplier capable of detecting an anomaly of a component thereof

2. Related Background Art

An example of the known emission control systems of internal combustion engine is an apparatus with a three way catalyst in the exhaust system to reduce CO, HC, and NOx components in exhaust gas and thereby clean up exhaust emissions. Furthermore, there is a known technique of connecting a secondary air supply path equipped with a switching valve, to an exhaust manifold, and pressure-feeding air (secondary air) into the exhaust manifold by means of an air pump to increase the oxygen content in exhaust, thereby effecting the cleanup based on promotion of oxidation of HC and CO in exhaust.

In the secondary air supplier of this type, where an anomaly occurs in such a component as the air pump or the switching valve, the cleanup efficiency of exhaust will drop, so as to worsen emissions. Therefore, it is necessary to promptly determine the anomaly. A known technology of detecting the anomaly of this kind is the one disclosed in Japanese Patent Application Laid-Open No. 9-125945. In this technology, a pressure sensor is placed on the secondary air supply path and, when a difference between a maximum and a minimum of pressure pulsation detected thereby is smaller than a predetermined value, it is determined that the secondary air supplier is abnormal, because of the absence of normal exhaust pulsation.

However, if the presence of exhaust pulsation is determined based on the condition that the difference between the maximum and minimum of pressure values is larger than the predetermined value as described above, there will arise the following problem. Namely, for example, in cases where there is a pressure pulsation caused by another source different from the exhaust pulsation, like noise on the values detected by the pressure sensor and where the aforementioned predetermined value for the determination is set small, there is a possibility of erroneously determining the pressure pulsation as the exhaust pulsation. Even if the predetermined value for the determination is set large in order to prevent it, surging of the air pump can also cause the pressure pulsation and in that case it might be erroneously determined as the exhaust pulsation.

SUMMARY OF THE INVENTION

An object of the present invention is to provide failure diagnosis apparatus for secondary air supplier capable of accurately determining a failure.

A failure diagnosis apparatus for secondary air supplier according to the present invention is an apparatus adapted to detect an anomaly of a component of a secondary air supplier based on pressure values and pressure pulsation in a secondary air supply path of the secondary air supplier for supplying secondary air to upstream of an exhaust emission purifying device of an internal combustion engine, wherein a determination threshold for detecting presence or absence of pressure pulsation used in finding an anomaly is varied according to pressure in the secondary air supplier.

The pressure pulsations detected by the pressure sensor in the secondary air supply system include one due to the exhaust pulsation, one caused by the secondary air supplier itself (the air pump and others), and one caused by noise of the measurement system. According to Inventor's knowledge, the pulsation caused by the noise of the measurement system is smaller than the other two pulsations, and the rest two pulsations are different in magnitude of pressure values and thus can be discriminated from each other by the magnitude of pressure values. Accordingly, when the determination threshold for presence or absence of pressure pulsation used in the determination on whether a component is normal or abnormal is varied according to the pressure in the secondary air supplier, the pressure pulsation due to the exhaust pulsation can be discriminated from the pressure pulsations caused by the other factors. This enables the apparatus to make an accurate failure diagnosis.

Here the aforementioned pressure pulsation caused by the secondary air supplier itself occurs at high pressure in the secondary air supplier and thus the pressure pulsation demonstrates large values. Therefore, preferably, the determination threshold for detecting the presence or absence of pressure pulsation is increased with increasing pressure in the secondary air supplier.

Preferably, a failure in each component is detected based on pressure behavior patterns with and without secondary air supply by the secondary air supplier. This permits the apparatus to discriminate a component with an anomaly and determine the failure part.

Preferably, the secondary air supplier comprises an air pump and switching means disposed downstream of the air pump. The pressure sensor detects a pressure value in the supply path between the switching means and the air pump. The apparatus is configured to detect the anomaly based on output from the pressure sensor. This permits the apparatus to determine a failure of each of the air pump and the switching means, based on the output from the pressure sensor.

Another failure diagnosis apparatus according to the present invention comprises a secondary air supply path connected to an upstream exhaust path of an emission purifying catalyst provided on the exhaust path of an internal combustion engine; secondary air supplying means for supplying air through the secondary air supply path onto the exhaust path; a pressure sensor for detecting pressure in the secondary air supply path; and failure diagnosing means for diagnosing a failure of the secondary air supplying means based on the pressure detected by the pressure sensor. The failure diagnosing means determines whether pressure pulsation exists or not based, on the detected pressure and a predetermined determination threshold and diagnoses the failure based on the presence or absence of pressure pulsation. This determination threshold is varied according to the pressure detected by the pressure sensor.

The presence or absence of pressure pulsation is significant in the diagnosis of failure, and, by varying the threshold used in detecting the presence or absence of pressure pulsation according to the detected pressure, it is feasible for the apparatus to accurately detect the presence or absence of pressure pulsation. The accurate determination on the presence or absence of pressure pulsation results in achieving an accurate failure diagnosis.

Preferably, the failure diagnosing means varies the determination threshold according to an average or smoothed value of the pressure detected by the pressure sensor. And the failure diagnosing means determines the presence or absence of pressure pulsation based on the determination threshold and a sum of average or smoothed values. When the determination threshold is varied according to the average or smoothed value, it is feasible to set an appropriate threshold. When the presence or absence of pressure pulsation is determined using the threshold and the sum, it is feasible to improve the diagnosis accuracy.

Another potential configuration is such that the presence or absence of pressure pulsation is determined based on a sum concerning the pressure detected by the pressure sensor, instead of the aforementioned sum of average or smoothed values. The sum concerning the detected pressure can be one of a sum of absolute values of differences between measured value and smoothed value of the detected pressure, a sum of lengths of loci of the detected pressure (lengths of loci along a pressure curve on the time and pressure coordinate axes), and so on.

Preferably, the apparatus has a pump as the secondary air supplying means on the secondary air supply path and a switching valve downstream of the pump, and the pressure sensor detects the pressure between the pump and the switching valve. Furthermore, preferably, the pressure sensor detects the pressure both with and without secondary air supply by the secondary air supplying means, and the failure diagnosing means specifies a failure part based on the detected pressures with and without the secondary air supply. The apparatus is advantageous because it is also able to specify the failure part, without being limited to only determining the presence or absence of failure.

It is also preferable herein that the failure diagnosing means be configured so that, after determining that the pressure pulsation is present, it determines whether the pressure pulsation is one due to the exhaust pulsation, based on the magnitude of the pressure detected by the pressure sensor. When it is determined whether the pressure pulsation is one caused by the exhaust pulsation or by the other factors as described above, the accuracy of the failure diagnosis can be further improved.

Preferably, the pressure sensor detects pressures both with and without secondary air supply by the secondary air supplying means, and the failure diagnosing means classifies pressure variations both with and without the secondary air supply into respective preset pressure behavior patterns and diagnoses the failure based on a combination of the two pressure behavior patterns. This permits the apparatus to make the simple and accurate failure diagnosis based on the combination of the patterns.

Furthermore, preferably, the apparatus further comprises supplied air quantity estimating means for estimating a quantity of secondary supply air based on the detected pressure. This permits the apparatus to also determine the failure of the secondary air supplier based on the supplied air quantity during the secondary air supply. This enables the apparatus, for example, to also diagnose such a failure during the supply of secondary air that the quantity supplied is insufficient.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

The preferred embodiments of the present invention will be described below in detail with reference to the accompanying drawings. For easier understanding of description, the same components will be denoted by the same reference symbols throughout the drawings as much as possible, without redundant description.

Figure 1:
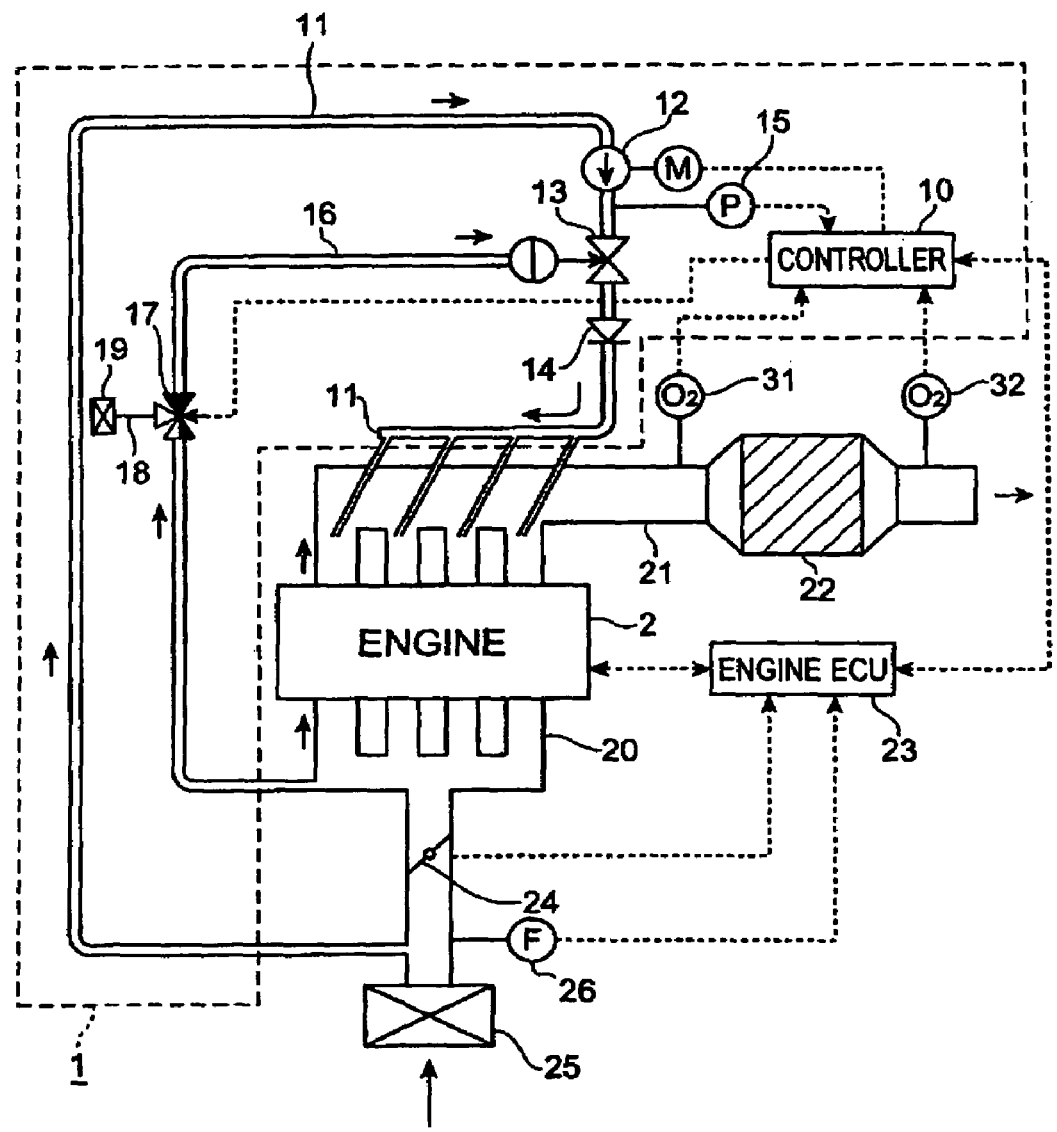
FIG. 1 is a schematic view showing a configuration of an internal combustion engine equipped with the secondary air supplier including the failure diagnosis apparatus for secondary air supplier according to the present invention.

FIG. 1 is a schematic view showing the configuration of the internal combustion engine equipped with the secondary air supplier including the failure diagnosis apparatus of the present invention. This secondary air supplier 1 is attached to a multi-cylinder gasoline engine (hereinafter referred to simply as an engine) 2 being an internal combustion engine. An intake pipe (manifold) 20 and an exhaust pipe (manifold) 21 are attached to the engine 2, and a throttle 24 is placed on the intake pipe 20. An intake air filter 25 is attached to an end of the intake pipe 20. An air flow meter 26 for measuring a quantity of air (quantity of primary air) is placed between the intake air filter 25 and the throttle 24. On the other hand, an emission purifying catalyst (device) 22 comprised of a three way catalyst is located on the exhaust pipe 21. $O_2$ sensors 31, 32 for detecting the oxygen content in exhaust are placed both upstream and downstream of the emission purifying catalyst 22. The $O_2$ sensors may be replaced by A/F sensors or linear $O_2$ sensors.

The secondary air supplier 1 is provided with a secondary air supply path 11 connecting a position of the intake pipe 20 between the intake air filter 25 and the throttle 24 and a position of the exhaust pipe (manifold) 21 between the engine 2 and the upstream $O_2$ sensor 31. On this secondary air supply path 11 there are provided an air pump (AP) 12 of an electric motor driven type, an air switching valve (ASV) 13, and a reed valve (RV) 14 being a check valve, from the side of intake pipe 20. A pressure sensor 15 is located between AP 12 and ASV 13. Connected to this ASV 13 is a pipe 16 extending from downstream of the throttle 24 in the intake pipe 20, and a three-way valve 17 is provided on this pipe 16. The other port of the three-way valve 17 is connected through a pipe 18 and a filter 19 to the ambient air. The pipe 16 and three-way valve 17 constitute a mechanism of opening and closing the ASV 13 by making use of intake manifold vacuum.

A controller 10 for controlling the operation of the secondary air supplier 1 is composed of a CPU, a RAM, etc. and is connected to an engine ECU 23 for controlling the engine, so as to be able to exchange information. The engine ECU 23 also functions as a failure diagnosing means. The controller 10 receives output signals from the pressure sensor 15 and from the $O_2$ sensors 31, 32 and controls driving of the motor for AP 12 and opening/closing of the three-way valve 17. The controller 10 may be configured as part of the engine ECU 23. This controller 10 includes the failure diagnosis apparatus according to the present invention. It is also possible to construct the failure diagnosis part independent of the controller 10, and the failure diagnosis part may also be incorporated into another system, e.g., a failure diagnosis system of a vehicle.

This secondary air supplier 1 executes secondary air supply control (hereinafter called AI [Air Injection] control) when a predetermined condition is satisfied. This predetermined condition can be, for example, a state in which the fuel content in air-fuel mixture is high at a cold start or the like (i.e., the air-fuel ratio is small) and in which the emission purifying catalyst 22 is not sufficiently warmed up yet (i.e., the function thereof is not fully demonstrated). When this condition is met, the controller 10 controls the three-way valve 17 to open ASV 13 by making use of the negative pressure in the intake pipe 20, and makes AP 12 driven. This results in guiding part of air from the air filter 25 through the secondary air supply path 11 into the exhaust pipe 21. As a result, the oxygen content in exhaust increases (to increase A/F), so as to promote secondary combustion of HC and CO in exhaust in the exhaust pipe 21 and thereby effect the exhaust cleanup. This secondary combustion increases the exhaust temperature to promote increase of temperature of the three-way catalyst in the emission purifying catalyst 22, thereby suppressing the degradation of emissions. An electromagnetic valve can also be used directly in the part of ASV 13, instead of the combination of ASV 13 with the three-way valve 17.

The failure diagnosis apparatus for secondary air supplier according to the present invention is an apparatus for detecting an anomaly in the components, i.e., AP 12, ASV 13, RV 14, and so on. Specifically, the controller 10 performs detection of a failure in the components on the basis of the pressure behavior detected by the pressure sensor 15 placed on the secondary air supply path 11.

Figure 2:
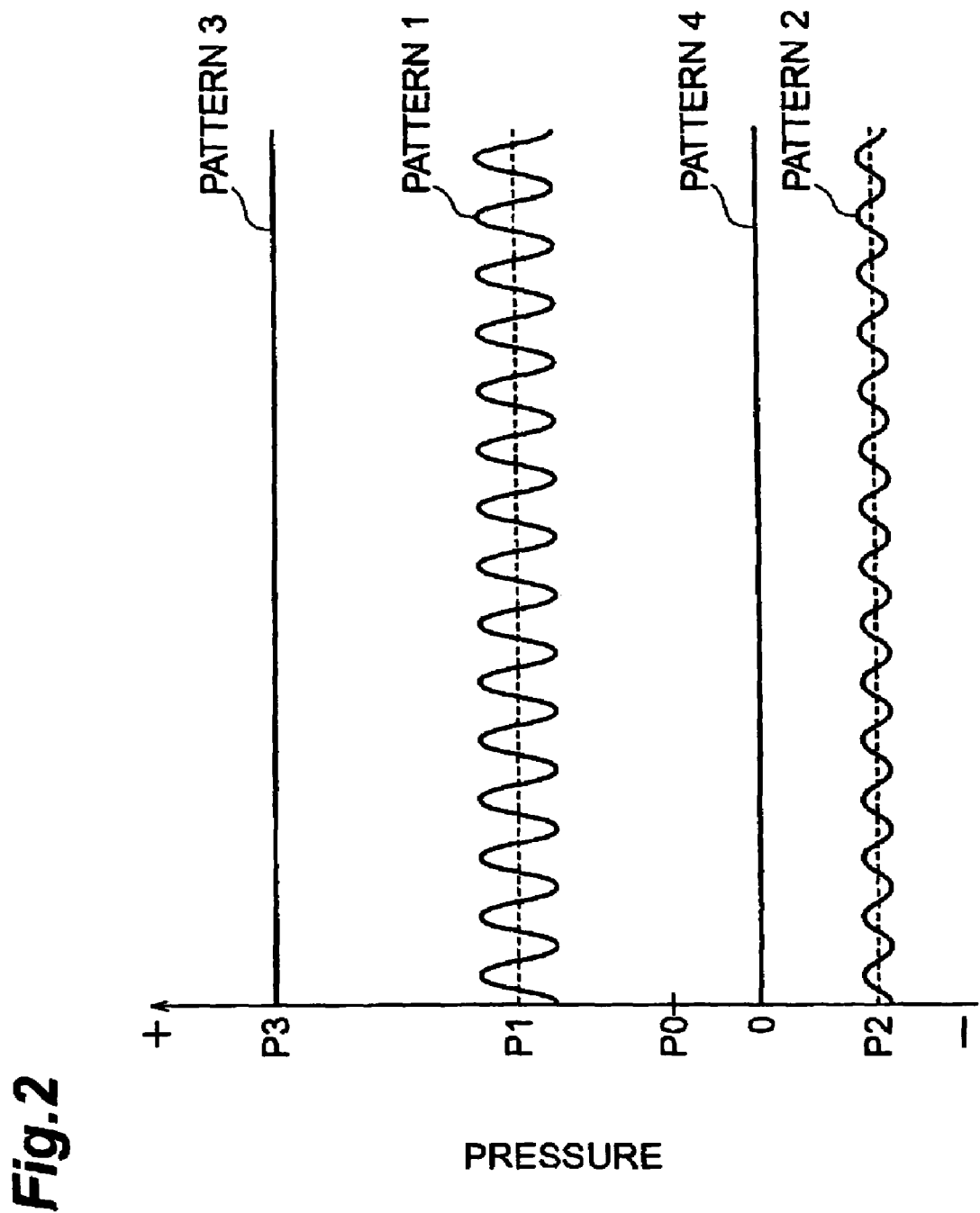
FIG. 2 is an illustration schematically showing pressure behavior patterns at the position of the pressure sensor in FIG. 1.

First, the principle of the detection will be outlined. FIG. 2 is a graph schematically showing possible patterns as pressure behaviors at the pressure sensor part in FIG. 1. It is supposed herein that RV 14 functions normally. Even if there exists RV 14, as long as the exhaust pressure pulsates on the main body side of engine 2, a pressure pulsation also occurs at the detecting part of pressure sensor 15. Table 1 below shows a list of pressure variation patterns (corresponding to FIG. 2) against combinations of operating states of AP 12 and ASV. 13.

TABLE 1

| AP 12 | ASV 13 | Pressure behavior pattern |
|---|---|---|
| on | open | 1 |
| off | open | 2 |
| on | closed | 3 |
| off | closed | 4 |

As apparent from Table 1, the operation circumstances of AP 12 and ASV 13 can be conversely estimated from the pressure behavior pattern.

Figure 3:
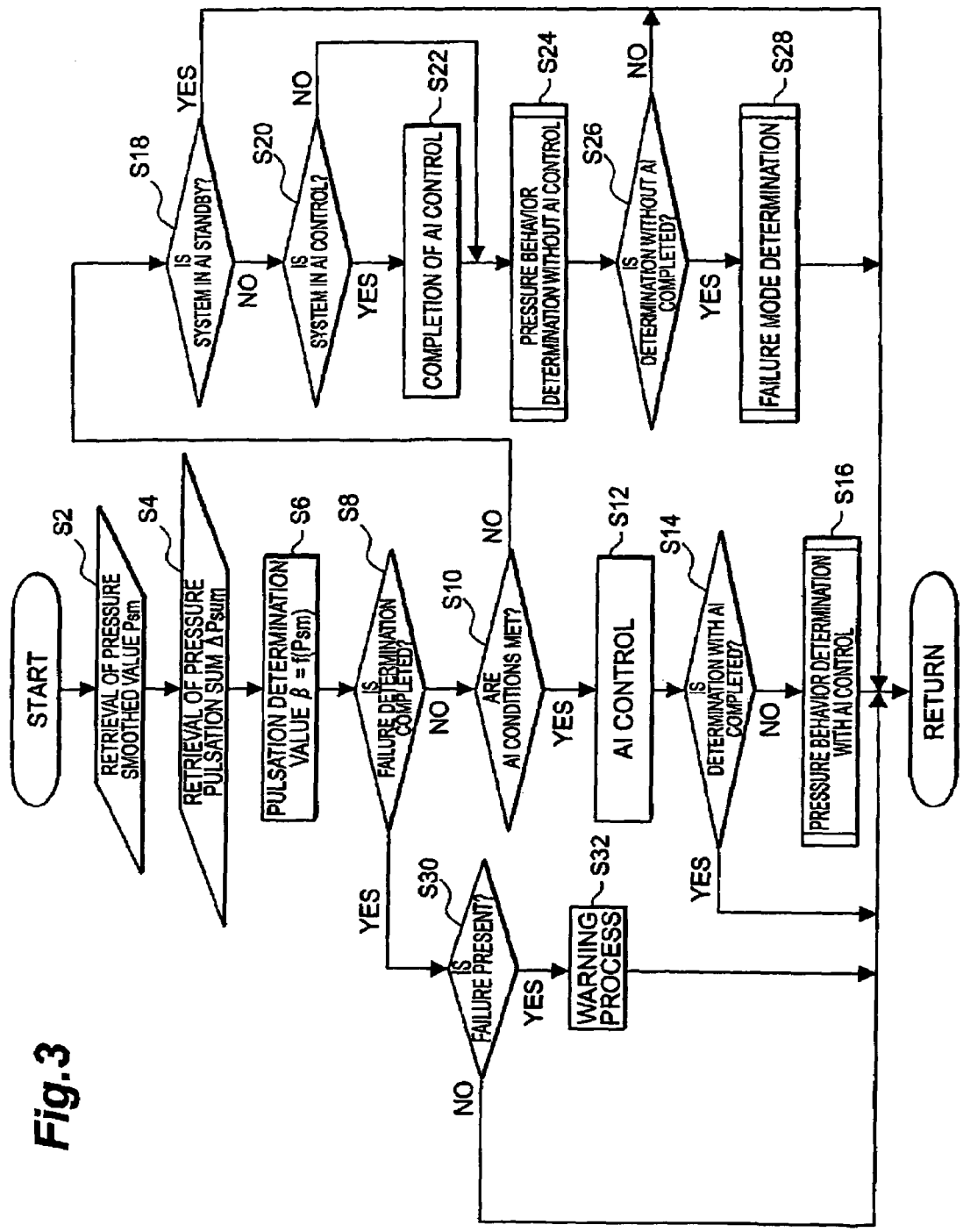
FIG. 3 is a main flowchart of a failure detection routine in the failure diagnosis apparatus for secondary air supplier according to the present invention.
Figure 4:
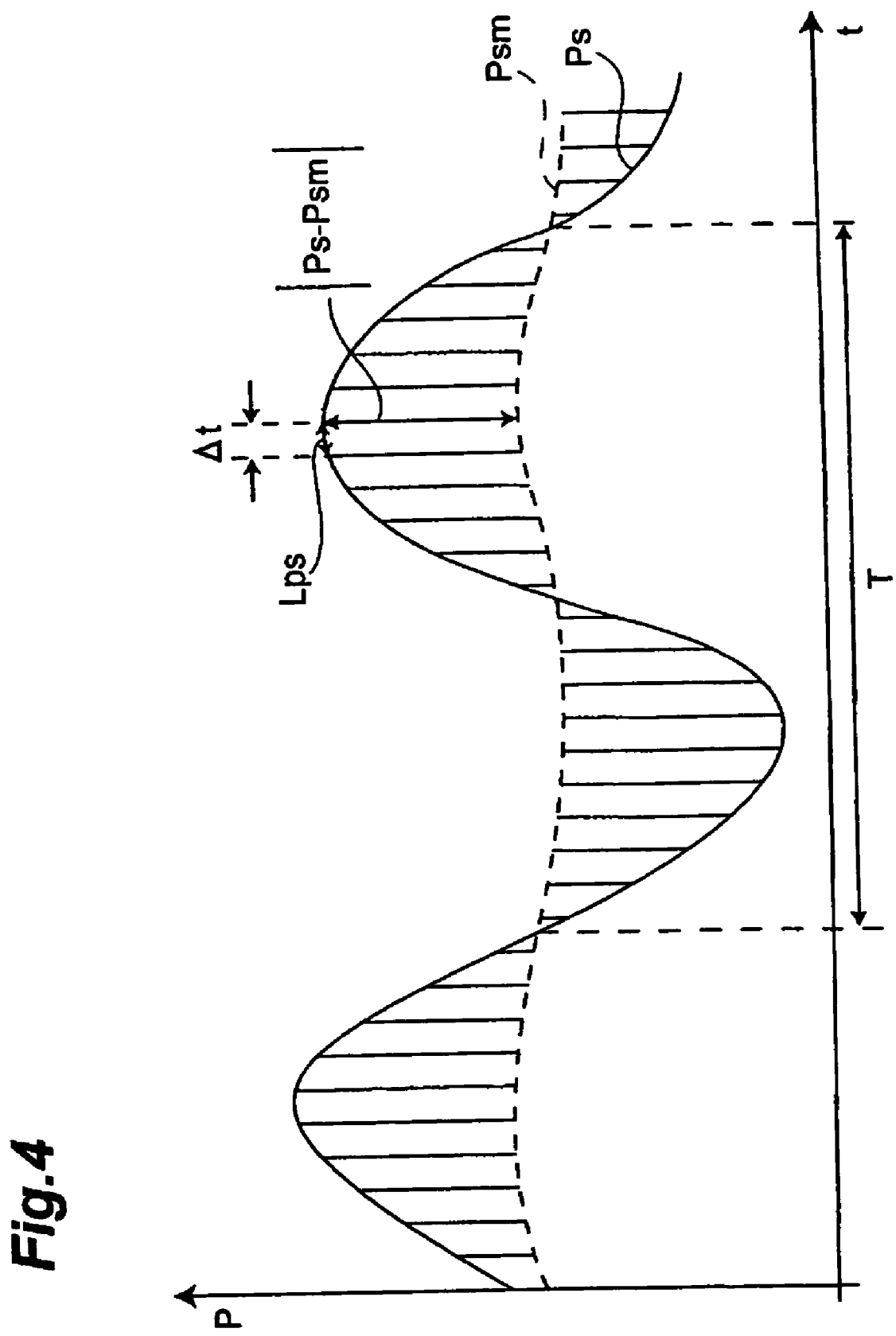
FIG. 4 is an illustration to illustrate a method of calculating a pressure smoothed value Psm and a pressure pulsation sum $\Delta Psum$ used in the processing of FIG. 3.
Figure 5:
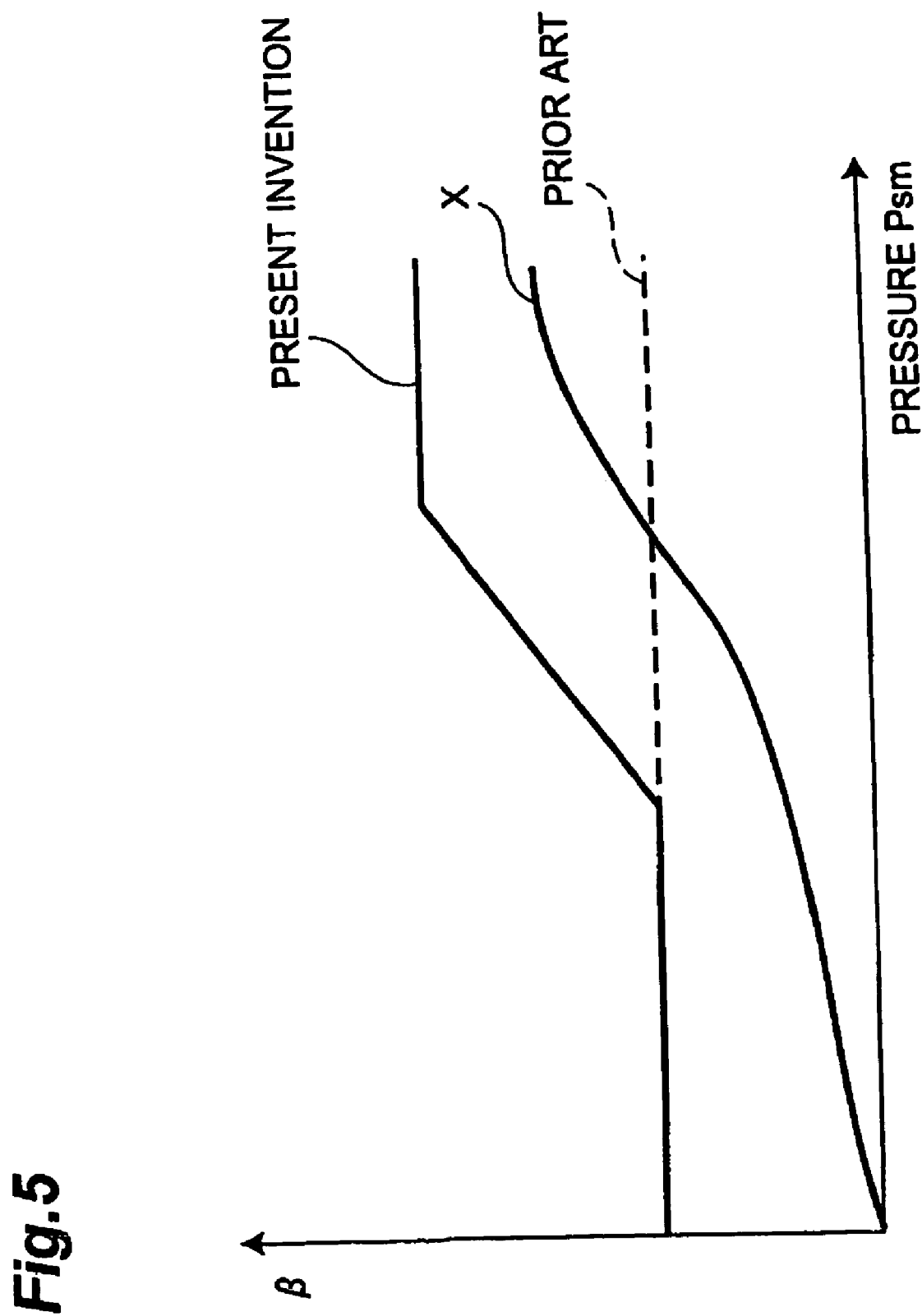
FIG. 5 is a graph showing an example of setting of the determination threshold $\beta$ used in the determination of pulsation in the processing of FIG. 3.
Figure 6:
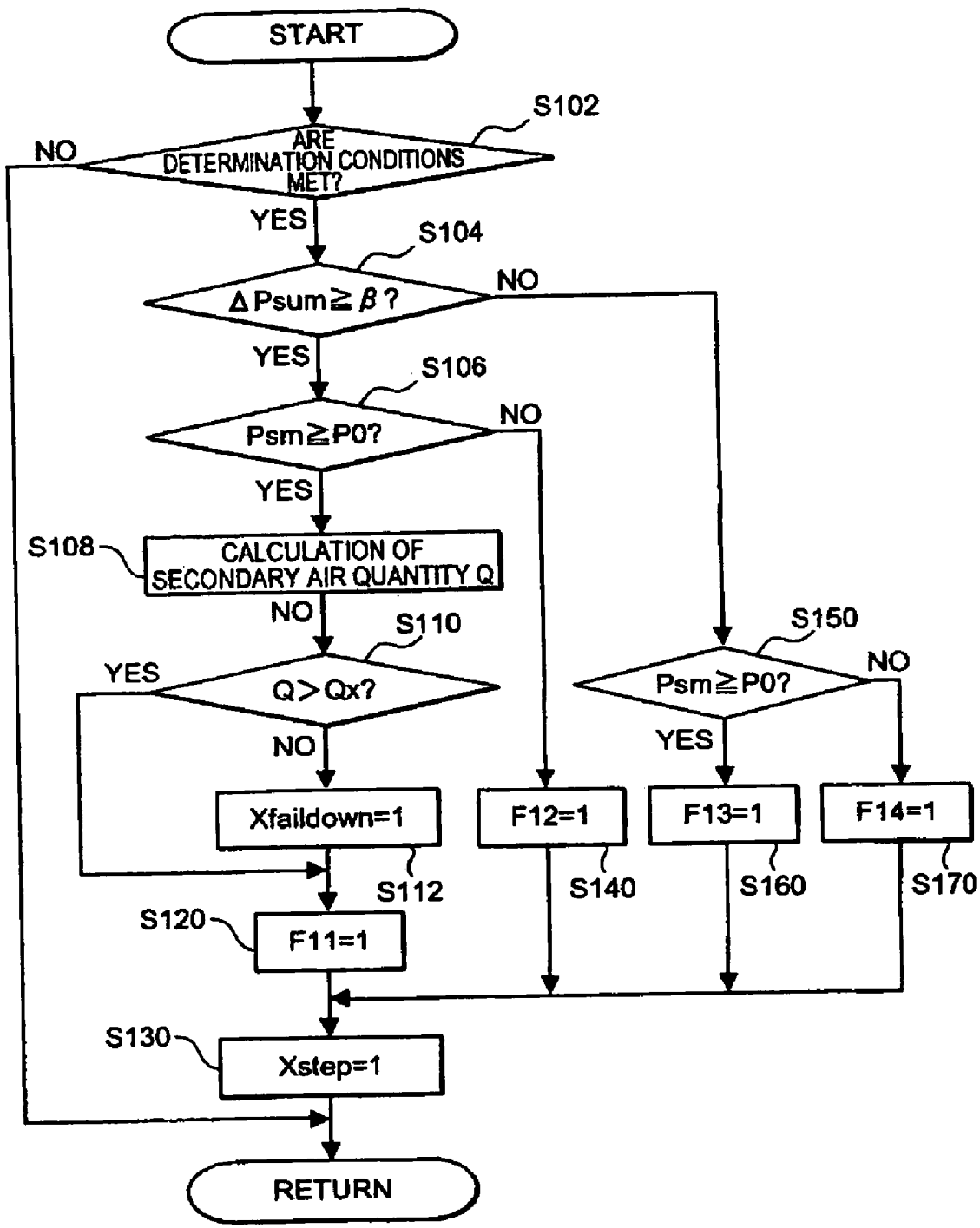
FIG. 6 is a flowchart showing a processing flow of pressure behavior determination with AI control in the processing of FIG. 3.
Figure 7:
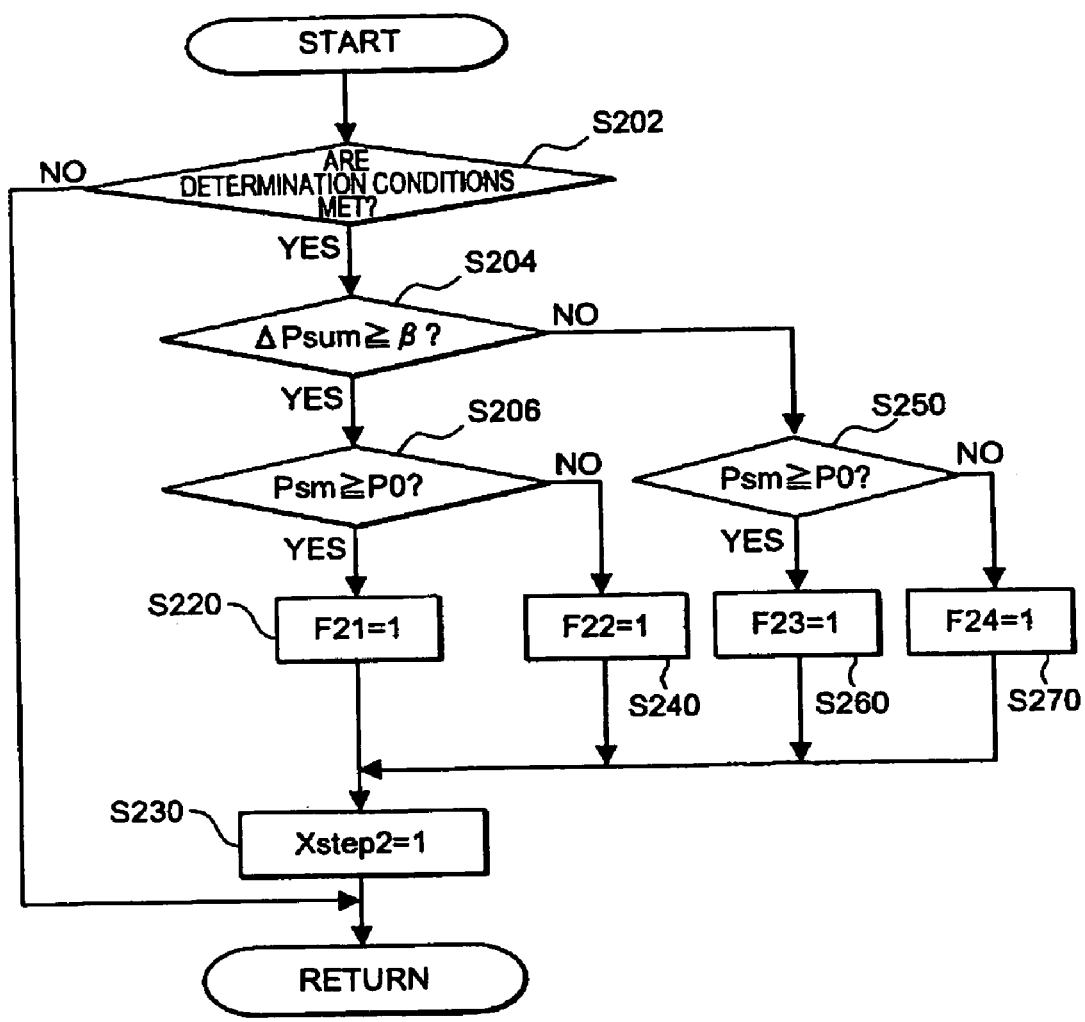
FIG. 7 is a flowchart showing a processing flow of pressure behavior determination without AI control in the processing of FIG. 3.
Figure 8:
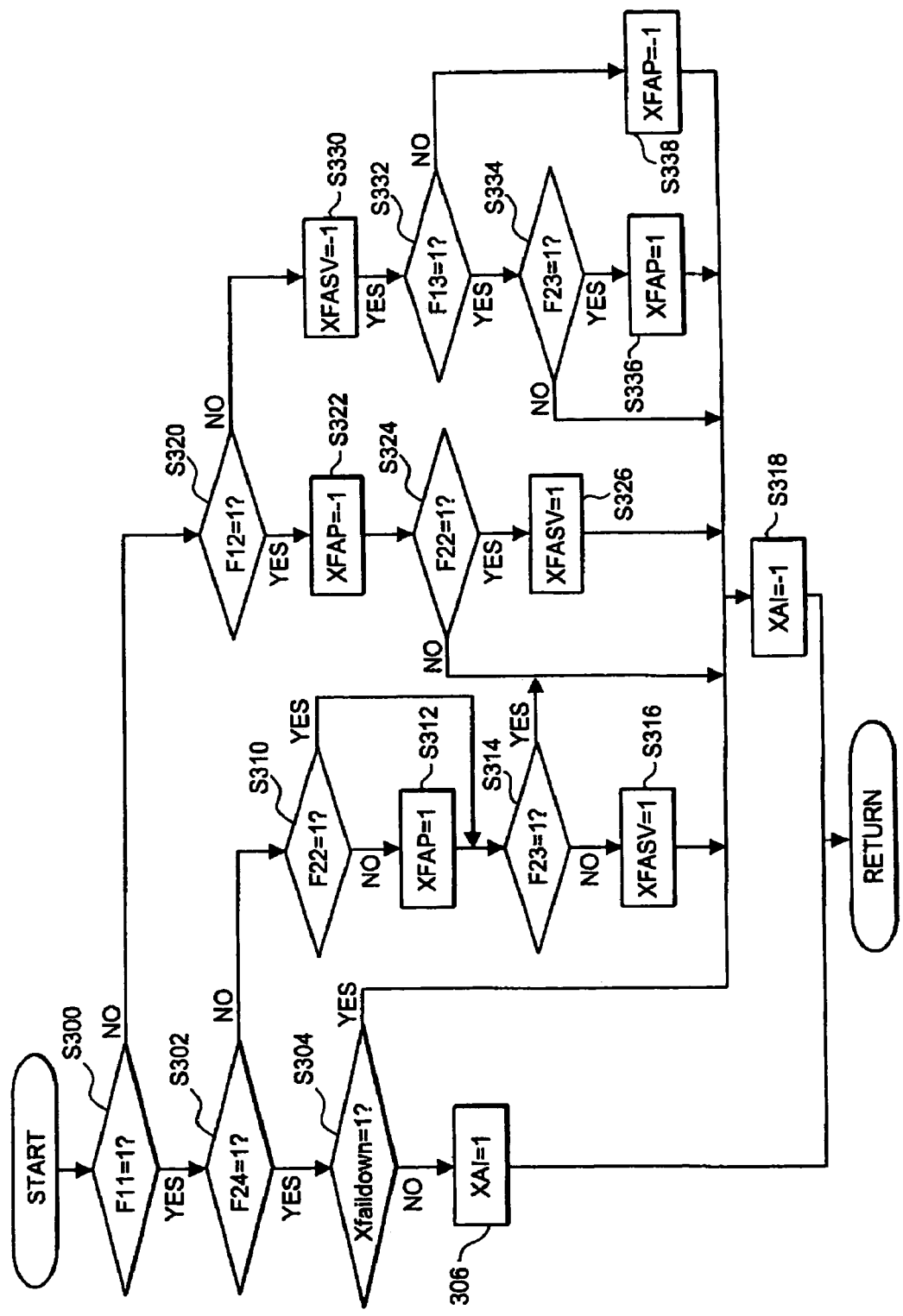
FIG. 8 is a flowchart showing a processing flow of the determination process in the processing of FIG. 3.

Subsequently, the actual failure detection routine will be described with reference to FIGS. 3 to 8. FIG. 3 is a main flowchart of this routine. FIG. 4 is an illustration to illustrate a method of calculating a pressure smoothed value Psm and a pressure pulsation sum ΔPsum used in this failure detection routine. FIG. 5 is a graph showing an example of setting of the determination threshold β used in the determination of pulsation. FIGS. 6 to 8 are flowcharts showing the details of subroutines in the processing of FIG. 3. The processing shown in FIG. 3 is regularly executed at predetermined timing by the controller 10 during the period between on and off of the ignition switch of a vehicle on which the engine 2 is mounted. The processes shown in FIGS. 6 to 8 are invoked each once from the main processing of FIG. 3. Each of after-described flags F11, F12, F13, F14, F21, F22, F23, F24, Xstep1, and Xstep2 is set to the initial value 0 at a start.

First, the pressure smoothed value Psm is retrieved (step S2). This pressure smoothed value Psm is expressed by Psm={n−1)×Psm_old+Ps}/n, where Ps is a pressure value detected in a current time step and Psm_old is a calculation result of the pressure smoothed value Psm in a right previous time step. FIG. 4 shows temporal changes of Psm and Ps determined in this way. If the time step Δt is sufficiently small relative to the period T of pressure variation (e.g., 4×Δt≦T) and if the coefficient n in the calculation of the smoothed value is sufficiently large relative to the period T (e.g., n×Δt≧2×T), Psm reduces to a value approximately equal to an average of pressure values Ps in a sampling interval (n×Δt). When the number of time steps after the start of processing is less than n, the number of time steps can be used instead of n. The calculation using the smoothed value as described above eliminates a need for storing pressure values in past time steps, decreases the required memory capacity, and enables effective utilization of computer resources in the controller 10 thanks to simplification of calculation.

Then the pressure pulsation sum ΔPsum is retrieved (step S4). This pressure pulsation sum ΔPsum is expressed by ΔPsum=(n−1)/n×ΔPsum_old+|Ps−Psm|, where ΔPsum_old is a pressure pulsation sum in a right previous time step. This is a summation of absolute values (precisely, a smoothed value thereof) of differences between pressure value Ps and average value (precisely, pressure smoothed value Psm) over n time steps. In order to accurately determine the sum over n time steps, it is necessary to store the differences in n time steps. However, the use of the smoothed value as described above eliminates a need for storing the calculation results in n past time steps and thus reduces the required memory capacity, just as in the case of the aforementioned calculation of pressure smoothed value. It also enables effective utilization of the computer resources in the controller 10 thanks to simplification of calculation.

In cases where there is a margin in the computer resources, it is also possible to store the values in n time steps and accurately calculate the average value and the sum. Although the present embodiment adopts the pressure pulsation sum ΔPsum in the determination of pressure pulsation, it is also possible to adopt a sum of lengths of loci (locus lengths) Lps in a predetermined interval of a plot line on the plot of Ps on the time t-pressure p coordinate axes. (It is also possible to employ a smoothed value in practical calculation.) This Lps is expressed by $\sqrt{(\Delta t^2 + (Ps-Ps\_old)^2)}$ for one time step (where Ps_old is a right previous value of pressure Ps). It is a matter of course that the pressure pulsation can be determined by an actual amplitude value of pressure within a predetermined duration (a difference between a maximum pressure value and a minimum pressure value).

Next, a pulsation determination value (determination threshold) β is set according to the pressure smoothed value Psm (step S6). FIG. 5 shows an example of relationship between Psm and β. In this figure, the thick solid line represents an example of setting of β in the present invention, whereas the dotted line the conventional threshold (fixed value). Surging can occur if the air pump continues pumping with ASV 13 closed even after a stop of AI control. During the surging by the pump, the sum ΔPsum (described later) of the pressure smoothed value Psm increases with increase in the pressure smoothed value Psm, as indicated by a curve X in FIG. 5. Under such circumstances, it is desirable to detect occurrence of the pressure pulsation due to the exhaust pulsation when the after-described sum ΔPsum exceeds the threshold β. However, if the threshold for determination of pressure pulsation (exhaust pulsation) is kept constant as in the prior art, there is a possibility of erroneously determining the pressure pulsation due to the surging as one due to the exhaust pulsation. In the present invention, the determination threshold β is varied according to the pressure smoothed value (which may be the average value) Psm, whereby the pressure pulsation due to the surging as described above can be prevented from being erroneously determined as one due to the exhaust pulsation.

After the setting of β, it is determined whether a failure determination has been completed (step S8). This can be determined by checking the value of after-described failure determination flag XAI. A preferred configuration is such that with detection of a failure, each failure determination flag is retained even after off of the ignition switch and cannot be reset before maintenance and inspection.

When the failure determination is not completed, the controller goes to step S10 to determine whether predetermined AI execution conditions are met. The execution conditions are determined by temperature of engine cooling water, intake temperature, elapsed time since a start, battery voltage, and a load condition, etc. sent from the engine ECU 23. Where control end conditions are satisfied during execution of the AI control, the execution conditions are determined not to be met, either.

When the AI execution conditions are met, the controller goes to step S12. If the AI control is under way, the AI control is continued. When the AI control is not under way, the AI control is initiated. Specifically, the three-way valve 17 is controlled to open ASV 13 by making use of the negative pressure in the intake pipe 20, and AP 12 is driven. As long as the devices operate normally, this control results in guiding part of air from the air filter 25 through the secondary air supply path 11 into the exhaust pipe 21.

At subsequent step S14, it is checked whether a pressure behavior determination with AI control has been completed. This can be determined by checking a value of after-described flag Xstep1. When the determination is completed, the controller skips subsequent processing to end.

When the pressure behavior determination with AI control is not completed, the controller moves to step S16 to perform a pressure behavior determination with AI control. FIG. 6 shows a processing flow of the pressure behavior determination with AI control.

First, it is checked whether determination conditions are met (step S102). The determination conditions are conditions indicating a state in which the pressure behavior can be stably determined. For example, a predetermined time has elapsed since the start of execution of AI control to stabilize the operation of AP 12 and the engine has been idling (idling is detected by the engine speed, load of engine 2, and/or the vehicle velocity and so on). When the determination conditions are not met, the controller skips the determination processing thereafter to end the processing.

When the determination conditions are satisfied, the pressure pulsation sum ΔPsum is compared with the determination threshold β (step S104). When ΔPsum is not less than β, it is determined that there is the pressure pulsation due to the exhaust pulsation and that the pulsation pattern is either one of patterns 1, 2 with large pulsation shown in FIG. 2, and the controller moves to step S106. At this step S106, the pressure smoothed value Psm is compared with a threshold P0 (cf. FIG. 2). When Psm is not less than P0, it is determined that the pressure behavior pattern is pattern 1 and that the secondary air supply is under way (the pump 12 is operating), and the controller moves to step S108 to calculate the quantity of secondary supply air flow Q.

The supply air quantity of AP 12 increases with increase in outlet pressure. Then the quantity of secondary supply air can be estimated from the outlet pressure (in practice, the pressure smoothed value Psm determined from the output of pressure sensor 15). If the quantity of secondary supply air is smaller than a predetermined threshold Qx, the fuel content in exhaust will be maintained high, which could lead to the degradation of emissions. It is thus checked whether the estimated supply air quantity is over this Qx (step S110). It is also possible to compare the pressure smoothed value Psm with a pressure threshold Px equivalent to an outlet pressure corresponding to Qx. In this case, the processes at steps S108 and S110 can be performed by a single transaction.

When it is determined at step S110 that the secondary supply air quantity is smaller, the controller goes to step S112 to set 1 indicating a drop of flow, in a flag Xfaildown indicating a flow condition. Then the controller goes to step S120. When the supply air quantity is sufficient, the controller directly moves to step S120. At step S120, the controller sets 1 indicating that the pressure behavior pattern in supply is pattern 1, in a flag F11. Thereafter, the controller moves to step S130 to set 1 indicating completion of the determination, in the flag Xstep1 indicating a determination of the pressure behavior pattern with AI control, and then terminates this subroutine.

When at step S106 Psm is less than P0, the pressure behavior pattern is determined to be pattern 2, and the controller goes to step S140 to set 1 indicating that the pressure behavior pattern in supply is pattern 2, in a flag F12. Thereafter, the process at step S130 is carried out and then this subroutine is terminated.

When at step S104 ΔPsum is less than β, it is determined that the pressure behavior pattern is either one of patterns 3, 4 without pulsation shown in FIG. 2, and the controller goes to step S150. At step S150 the pressure smoothed value Psm is then compared with the threshold P0, as at step S106.

When Psm is not less than P0, the pressure behavior pattern is determined to be pattern 3, and the controller goes to step S160 to set 1 indicating that the pressure behavior pattern in supply is pattern 3, in a flag F13. Thereafter, the process at step S130 is carried out and this subroutine is terminated.

On the other hand, when at step S150 Psm is less than P0, the pressure behavior pattern is determined to be pattern 4, and the controller goes to step S170 to set 1 indicating that the pressure behavior pattern in supply is pattern 4 in a flag F14. Thereafter, the process at step S130 is carried out, and this subroutine is terminated.

After completion of the subroutine in FIG. 6, the processing is terminated and, if the ignition switch is on, the controller returns to step S2.

When it is determined at step S10 that the AI execution conditions are not met, the controller goes to step S18 to determine whether the system is in an AI control standby mode, i.e., in a state in which after the start of engine the AI execution conditions are not met, or is already in the AI control. In practice, it can be determined by checking whether the value of Xstep1 is set to 1 indicating completion of determination. When the value of Xstep1 is set at the initial value 0 indicating incompletion of determination, it is determined that the system is in the standby mode, and the controller skips subsequent processing to end the processing. On the other hand, when the flag is set at 1 indicating completion of determination, the controller goes to step S20 to determine whether the AI control is now under way. When the AI control is now under way, a process of terminating the AI control is carried out (step S22). Specifically, the three-way valve 17 is controlled to guide the ambient air through the filter 19 to ASV 13 so as to close ASV 13, and the AP 12 is stopped, thereby terminating the AI control.

After the termination of the AI control, the controller executes the pressure behavior determination process without AI control (step S24) FIG. 7 shows a processing flow of the pressure behavior determination without AI control.

First, it is checked whether determination conditions are met (step S202). The determination conditions are conditions indicating a state in which the pressure behavior can be stably determined. For example, a predetermined time has elapsed since the stop of the AI control (a time necessary for the stop of normally functioning AP 12 has elapsed) and the engine has been idling (idling is detected by the engine speed, load of engine 2, and/or the vehicle velocity and so on). When the determination conditions are not met, the controller skips the determination processing thereafter to end the processing.

When the determination conditions are met, the pressure pulsation sum ΔPsum is compared with the determination threshold β (step S204). When ΔPsum is not less than β, it is determined that there is the pressure pulsation due to the exhaust pulsation and that the pressure pulsation pattern is either one of the patterns 1, 2 with large pulsation shown in FIG. 2, and the controller goes to step S206. At this step S206, the pressure smoothed value Psm is compared with the threshold P0. When Psm is not less than P0, it is determined that the pressure behavior pattern is pattern 1, and the controller goes to step S220 to set 1 indicating that the pressure behavior pattern in stop is pattern 1, in a flag F21.

When at step S206 Psm is less than P0, it is determined that the pressure behavior pattern is pattern 2, and the controller goes to step S240 to set 1 indicating that the pressure behavior pattern in stop is pattern 2 in a flag F22.

When at step S204 Δsum is less than β, the pressure behavior pattern is determined to be either one of patterns 3, 4 without pulsation shown in FIG. 2, and the controller goes to step S250. At step S250 Psm is then compared with P0, as at step S206. When Psm is not less than P0, the pressure behavior pattern is determined to be pattern 3, and the controller goes to step S260 to set 1 indicating that the pressure behavior pattern in stop is pattern 3, in a flag F23.

On the other hand, when at step S250 Psm is less than P0, the pressure behavior pattern is determined to be pattern 4, and the controller goes to step S270 to set 1 indicating that the pressure behavior pattern in stop is pattern 4, in a flag F24.

In either case after the setting of the flags F21–F24, the controller goes to step S230 to set 1 indicating completion of the determination, in a flag Xstep2 indicating a determination of the pressure behavior pattern without AI control, and then terminates the subroutine.

After completion of the subroutine of FIG. 7, the controller moves to step S26 in the main flow shown in FIG. 3. At step S26, the value of flag Xstep2 is checked to check whether the pressure behavior determination in stop is finished. When Xstep2 is the other value than 1, the determination of the pressure behavior pattern without AI control is not completed yet, and the controller skips the subsequent processing to end the processing. On the other hand, when Xstep2 is 1, the determination of the pressure behavior pattern without AI control is also completed, and then the controller goes to next processing step S28.

At step S28, a failure mode of the components is determined based on the determination results of the pressure behavior patterns at steps S16 and S24. Table 2 presents a list of combinations of pressure behavior patterns with AI control and without AI control against combinations of normal and abnormal modes of each of AP 12 and ASV 13.

TABLE 2

| | | | | Pressure behavior patterns | |
| --- | --- | --- | --- | --- | --- |
| Mode | AP 12 | | ASV 13 | with AI control | without AI control |
| 1 | ○ | | ○ | | 1 | 4 |
| 2 | ○ | | x | open-stuck | 1 | 2 |
| 3 | ○ | | x | closed-stuck | 3 | 4 |
| 4 | x | always on | ○ | | 1 | 3 |
| 5 | x | always on | x | open-stuck | 1 | 1 |
| 6 | x | always on | x | closed-stuck | 3 | 3 |
| 7 | x | inoperative | ○ | | 2 | 4 |
| 8 | x | inoperative | x | open-stuck | 2 | 2 |
| 9 | x | inoperative | x | closed-stuck | 4 | 4 |

In the table above, ○ means normal, and x represents a failure of equipment.

The determination process at this step S28 is carried out based on this Table 2. FIG. 8 shows the processing flow of this determination processing routine. First, it is checked whether the flag F11 is 1 (step S300). When the flag is 1, it indicates that the pressure behavior pattern with AI control is pattern 1, and then the controller goes to step S302 to check whether the flag F24 is 1. When the flag F24 is 1, it indicates that the pressure behavior pattern without AI control is pattern 4, and, as apparent from Table 2, this combination is mode 1 in Table 2, which indicates that AP 12 and ASV 13 both are normal. Then the controller moves to step S304 to check the value of the flag Xfaildown indicating the flow state, to check whether there occurs a drop of flow. When Xfaildown is not 1, there occurs no drop of flow and the devices both are normal. Therefore, the controller goes to step S306 to set 1 indicating normal, in the failure diagnosis flag XAI, and then terminates the subroutine. On the other hand, when Xfaildown is 1, there occurs a drop of flow and thus there is a possibility of operation failure of AP 12. Therefore, the controller goes to step S318 to set −1 indicating anomaly, in the failure diagnosis flag XAI and then terminates the subroutine.

When at step S302 F24 is not 1, the pressure behavior pattern is one of the modes 2, 4, and in Table 2, and thus the controller goes to step S310. At this step S310, it is first checked whether the flag F22 is 1. When F22 is not 1, i.e., in the case of the modes 4, 5 where the pressure behavior pattern without AI control is not pattern 2 but either of patterns 3, 1, AP 12 is in a failure in which it is always on, and thus the controller goes to step S312 to set 1 indicating the always-on failure, in an air pump failure diagnosis flag XFAP. Then the controller moves to step S314. On the other hand, when F22 is 1, i.e., in the case where the pressure behavior pattern without AI control is pattern 2, i.e., in the case of the mode 2, AP 12 is normal and thus the controller skips step S312 and moves to step S314.

At subsequent step S314, it is checked whether the flag F23 is 1. When F23 is not 1, i.e., in the case of the modes 2, 5 where the pressure behavior pattern without AI control is not pattern 3 but either of patterns 2, 1, ASV 13 is in open-stuck where it is always open, and thus the controller goes to step S316. At step S316 the controller sets 1 indicating the open-stuck, in a failure diagnosis flag XFASV of ASV, thereafter goes to step S318 to set −1 in the failure diagnosis flag XAI, and then ends the subroutine. On the other hand, when F23 is 1, i.e., in the case where the pressure behavior pattern without AI control is pattern 3, i.e., in the case of the mode 4, ASV 13 is normal, and thus the controller skips step S316 to move to step S318 to set −1 in the failure diagnosis flag XAI, and then terminates the subroutine.

On the other hand, when it is determined at step S300 that F11 is not 1, it indicates that the mode is one of modes 3 and 6–9. In this case, the controller goes to step S320 to check whether the flag F12 is 1. When F12 is 1, i.e., in the case where the pressure behavior pattern with AI control is pattern 2, the mode is either of the modes 7, 8. In either case AP 12 is inoperative, and thus the controller sets −1 indicating the inoperative failure, in the air pump failure diagnosis flag XFAP and then goes to step S324. At this step S324, it is checked whether the flag F22 is 1. When F22 is 1, i.e., in the case where the pressure behavior pattern without AI control is pattern 2, the mode is mode 8, and ASV 13 is in the open-stuck in which it is always open. Therefore, the controller goes to step S326. At step S326, the controller sets 1 indicating the open-stuck, in the ASV failure diagnosis flag XFASV, thereafter goes to step S318 to set −1 in the failure diagnosis flag XAI, and terminates the subroutine. On the other hand, when F22 is not 1, the mode is mode 7, in which ASV 13 is normal, and thus the controller skips step S326 to go to step S318 to set −1 in the failure diagnosis flag XAI, and then terminates the subroutine.

On the other hand, when it is determined at step S320 that F12 is not 1, the mode is one of the modes 3, 6, and 9. In either case ASV 13 is in closed-stuck in which it is always closed, and thus the controller goes to step S330 to set −1 indicating the closed-stuck, in the ASV failure diagnosis flag XFASV. At subsequent step S332 it is checked whether the flag F13 is 1. When F13 is 1, the pressure behavior pattern with AI control is pattern 3, which indicates that the mode is either of the modes 3, 6. In this case, the controller goes to step S334 to check whether the flag F23 is 1. When the flag F23 is 1, the pressure behavior pattern without AI control is also pattern 3 and thus the mode is mode 6, in which AP 12 is in a failure in which it is always on. Then the controller goes to step S336 to set 1 indicating the always-on failure, in the air pump failure diagnosis flag XFAP. Thereafter, the controller goes to step S318 to set −1 in the failure diagnosis flag XAI and then terminates the subroutine. On the other hand, when F23 is not 1, the mode is mode 3, in which AP 12 is normal. Therefore, the controller skips step S336 to go to step S318 to set −1 in the failure diagnosis flag XAI, and then terminates the subroutine.

When it is determined at step S332 that F13 is not 1, it indicates that the mode is mode 9 in which AP 12 is in the inoperative failure. Then the controller moves to step S338 to set −1 indicating the inoperative failure, in the air pump failure diagnosis flag XFAP, thereafter goes to step S318 to set −1 in the failure diagnosis flag XAI, and then terminates the subroutine. After completion of the subroutine of FIG. 8, the controller also terminates the processing of the main routine and, if the ignition switch is still on, the controller again performs the processing from step S2.

In the case where the determination process has been completed (including the case where a failure has already been detected but is not reset through maintenance and inspection), the aforementioned step S8 results in finding setting of another value than the initial value 0 in the failure diagnosis flag XAI, and thus the controller goes to step S30. At step S30, the controller further checks whether −1 indicating the failure is set in the failure diagnosis flag XAI, thereby determining the presence or absence of a failure. When the value is 1 indicating that the system is normal, the controller skips step S32 to terminate the processing. On the other hand, when the value is −1 indicating a failure in the system, the controller moves to step S32 to perform a warning process to notify the driver through a display or an alarm not shown, that the secondary air supplier suffers a failure or anomaly, and then terminates the processing.

By this anomaly detection routine according to the present invention, it becomes feasible to accurately detect what kind of failure is suffered by either the air pump or ASV. Particularly, the threshold (β in the above-described flow) to determine whether the pressure pulsation is one due to the exhaust pulsation is varied according to the pressure value (the pressure smoothed value Psm in the above-described flow), which enables the apparatus to make an accurate pressure behavior determination. Specifically, when AP 12 is in the always-on failure, there can occur the pressure pulsation by surging due to discharge of air from AP 12 without AI control. If the presence or absence of the exhaust pulsation should be determined based on only the presence or absence of the pressure pulsation as in prior art, the controller could determine that the pressure behavior pattern in this case was not pattern 3 but pattern 1 and that there was an open failure, though ASV 13 was normal. In contrast to it, the present invention permits the controller to accurately determine that the pressure behavior pattern in this case is pattern 3, without making such an erroneous decision that ASV 13 suffers a failure. In the case where the output from the pressure sensor 15 contains noise, the controller can also accurately determine the pressure behavior pattern, without making such an erroneous decision that the pressure behavior pattern is pattern 1 or pattern 2, instead of pattern 4 or pattern 3, whereby the controller is able to accurately determine an anomaly of the components.

The above described the example in which the threshold was varied according to the pressure smoothed value (average value), but the threshold may also be varied according to a peak value (maximum value or minimum value) or the like.

The above described the example in which the pressure behavior determination process without AI control was carried out after completion of the AI control and in which the abnormal determination process was carried out thereafter, but another potential example is such that during the AI control the supply is forced into a temporary halt and the pressure behavior determination without AI control is carried out to make a decision on anomaly. This enables the controller to perform the failure diagnosis during the AI control.

As seen from Table 2, if the device is in the normal condition, the pressure behavior pattern with AI control should be pattern 1. This allows us to adopt a configuration wherein, where the pressure behavior pattern with AI control is not pattern 1, the controller immediately terminates the AI control and shifts to the pressure behavior pattern determination in stop. Particularly, when the pressure behavior pattern with AI control is pattern 4, it is obvious that the failure situation is mode 9 shown in Table 2. Therefore, it is also possible to skip the pressure behavior pattern determination in stop.

The pressure sensor 15 can be a relative pressure sensor which outputs a differential pressure from the atmospheric pressure, or an absolute pressure sensor. In this case, the system needs to be configured so as to be able to detect the atmospheric pressure in the inactive of the secondary air supply. In ordinary AP 12, its housing is not in close fit with a pump rotor, and in the inactive of AP 12, portions before and after it are in communication with each other. Therefore, in the case of AP 12 of this type, it is possible to detect the atmospheric pressure. In this configuration, an output value before a start of the engine can be used as the atmospheric pressure and a relative pressure can be calculated as a difference therefrom. This enables the pressure sensor 15 to be used as an atmospheric pressure sensor during periods other than occasions of anomaly detection of the secondary air system and durations of the secondary air supply. However, there is a possibility of estimating the atmospheric pressure high by the degree of discharge pressure in the always-on failure of AP 12. In this case, checking the operation power, voltage, current, or the like of AP 12 can make a correction. In the open-stuck of ASV 13, there is also a possibility of transferring the exhaust pulsation of engine 2. In this case, since an average pressure becomes close to the atmospheric pressure, the atmospheric pressure can be detected from an averaging process.

According to the present invention, as described above, the determination threshold β for determination of presence or absence of pressure pulsation (exhaust pulsation) is varied according to the pressure value (e.g., the smoothed value or average value of measured values of pressure, or the peak value), whereby the apparatus is able to accurately determine the presence or absence of exhaust pulsation while eliminating the pressure pulsations except for that due to the exhaust pulsation (e.g., the pressure pulsation due to the noise of the pressure sensor and the pressure pulsation caused by the surging of the air pump). As a result, the apparatus is able to accurately determine the pressure behaviors, which improves the accuracy of the failure diagnosis of the secondary air supplier based on the pressure behaviors.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A failure diagnosis apparatus for secondary air supplier, which is adapted to detect an anomaly of a component of a secondary air supplier based on a pressure value and a pressure pulsation in a secondary air supply path of the secondary air supplier configured to supply secondary air to upstream of an exhaust emission purifying device of an internal combustion engine, the failure diagnosis apparatus comprising a pressure sensor for detecting pressure in the secondary air supply path; and failure diagnosing device that diagnoses a failure based on the pressure and pressure pulsation detected by the pressure sensor, wherein the failure diagnosing device varies a determination threshold for detecting presence or absence of pressure pulsation according to the pressure in the secondary air supplier.

2. The failure diagnosis apparatus according to claim 1, wherein the failure diagnosing device increases the determination threshold with increase in the pressure in the secondary air supplier.

3. The failure diagnosis apparatus according to claim 1, wherein the failure diagnosing device detects a failure of each component, based on a pressure behavior pattern during secondary air supply and a pressure behavior pattern without secondary air supply.

4. The failure diagnosis apparatus according to claim 1, wherein the secondary air supplier further comprises an air pump and switching device disposed downstream of the air pump, wherein the pressure sensor detects the pressure value in the supply path between the switching device and the air pump.

5. A failure diagnosis apparatus for secondary air supplier, comprising:

a secondary air supply path connected to an upstream exhaust path of an emission purifying catalyst disposed on the exhaust path of an internal combustion engine;

secondary air supplying device that supplies air through the secondary air supply path onto the exhaust path;

a pressure sensor for detecting pressure in the secondary air supply path; and failure diagnosing device that diagnoses a failure of the secondary air supplying device based on the pressure detected by the pressure sensor, wherein the failure diagnosing device varies a determination threshold according to the pressure detected by the pressure sensor, determines whether a pressure pulsation exists or not based on the pressure and the determination threshold, and makes a failure diagnosis based on the presence or absence of pressure pulsation.

6. The failure diagnosis apparatus according to claim 5, wherein the failure diagnosing device varies the determination threshold according to an average or smoothed value of the pressure detected by the pressure sensor, and determines whether the pressure pulsation exists or not based on the determination threshold and a sum of the average or smoothed values.

7. The failure diagnosis apparatus according to claim 5, wherein the failure diagnosing device determines the determination threshold based on the pressure detected by the pressure sensor and determines whether the pressure pulsation exists or not based on the determination threshold and a sum concerning the detected pressure.

8. The failure diagnosis apparatus according to claim 7, wherein the sum is a sum of absolute values of differences between measured value and smoothed value of the detected pressure.

9. The failure diagnosis apparatus according to claim 7, wherein the sum is a sum of lengths of loci of the detected pressure.

10. The failure diagnosis apparatus according to claim 6, comprising a pump as the secondary air supplying device on the secondary air supply path, and a switching valve downstream of the pump, wherein the pressure sensor detects the pressure between the pump and the switching valve.

11. The failure diagnosis apparatus according to claim 10, wherein the pressure sensor detects the pressure both with and without a secondary air supply by the secondary air supplying device, and wherein the failure diagnosing device specifies a failure part based on the detected pressures with and without the secondary air supply.

12. The failure diagnosis apparatus according to claim 6, wherein, after determining that there is a pressure pulsation, the failure diagnosing device determines whether the pressure pulsation is one due to exhaust pulsation, based on magnitude of the detected pressure.

13. The failure diagnosis apparatus according to claim 6, wherein the pressure sensor detects the pressure both with and without a secondary air supply by the secondary air supplying device, and wherein the failure diagnosing device classifies pressure variations both with and without the secondary air supply into preset pressure behavior patterns and makes a failure diagnosis based on a combination of the pressure behavior pattern with the secondary air supply and the pressure behavior pattern without the secondary air supply.

14. The failure diagnosis apparatus according to claim 6, further comprising supplied air quantity estimating device that estimates a quantity of secondary supply air based on the detected pressure.

* * * * *